United States Patent [19]

Jakobsson et al.

[11] Patent Number: 5,732,258

[45] Date of Patent: Mar. 24, 1998

[54] METHOD AND APPARATUS FOR EFFICIENTLY EVALUATING EXISTS AND NOT EXISTS EQUIVALENT SUBQUERIES

[75] Inventors: Hakan Jakobsson, San Francisco; Atif Chaudhry, Newark, both of Calif.

[73] Assignee: Oracle Corporation, Redwood Shores, Calif.

[21] Appl. No.: 598,518

[22] Filed: Feb. 8, 1996

[51] Int. Cl.$^6$ .................................................. G06F 17/30
[52] U.S. Cl. ..................... 395/604; 395/602; 395/603; 395/605; 395/606
[58] Field of Search ................ 395/602–6; 364/283.4, 364/974.6

[56] References Cited

U.S. PATENT DOCUMENTS

| | | | |
|---|---|---|---|
| 4,817,140 | 3/1989 | Chandra | 380/4 |
| 5,345,585 | 9/1994 | Iyer et al. | 707/2 |
| 5,367,675 | 11/1994 | Cheng et al. | 395/602 |
| 5,619,692 | 4/1997 | Malkemus et al. | 395/602 |
| 5,659,725 | 8/1997 | Levy et al. | 395/603 |

OTHER PUBLICATIONS

"The Existential Quantifier" from (A guide to SQL/LD by CJ Date and CJ White, pp. 105–111, Feb. 1989.

Primary Examiner—Thomas G. Black
Assistant Examiner—Diane Mizrahi
Attorney, Agent, or Firm—Lowe, Price, LeBlanc & Becker

[57] ABSTRACT

A method for transforming database queries that have EXISTS-equivalent subqueries (i.e. subqueries that are semantically equivalent to EXISTS or NOT EXISTS subqueries) is disclosed. Logical expressions are removed from a WHERE CLAUSE in the original EXISTS-equivalent subquery to produce a revised subquery. For each of the logical expressions that are removed, a substitute query component is generated based on whether (1) the logical expression contains any reference to any table in a FROM-list in the EXISTS-equivalent subquery and (2) the original EXISTS-equivalent subquery is equivalent to an EXISTS or a NOT EXISTS subquery. The transformed query is created by replacing the original EXISTS-equivalent subquery with the revised subquery and the query components that were generated for each of removed logical expressions. Some of the substitute query components, including the revised subquery, may be merged based on knowledge of access paths. These transformation techniques may be applied after converting the EXISTS-equivalent subquery to an EXISTS or NOT EXISTS subquery. Alternatively, the techniques may be applied directly to queries that contain EXISTS-equivalent subqueries without converting the EXISTS-equivalent subqueries to EXISTS or NOT EXISTS subqueries. The transformed queries produced by this technique may be processed more efficiently by database applications than the original queries.

18 Claims, 5 Drawing Sheets

METHOD AND APPARATUS FOR EFFICIENTLY EVALUATING EXISTS AND NOT EXISTS EQUIVALENT SUBQUERIES

FIELD OF THE INVENTION

The present invention relates to transforming database queries, and more specifically, to a method and apparatus for transforming queries that include "EXISTS" subqueries and subqueries that are equivalent to "EXISTS" subqueries.

BACKGROUND OF THE INVENTION

Relational databases store information in indexed tables. A user retrieves information from the tables by entering input that is converted to queries by a database application. The database application submits the queries to a database. In response to a query, the database accesses the tables specified in the query to determine which information within the tables satisfies the queries. The information that satisfies the queries is then retrieved by the database and transmitted to the database application.

For any given database application, the queries must conform to the rules of a particular query language. Most query languages provide users a variety of ways to specify information to be retrieved. For example, in the Structured Query Language (SQL), the query:

SELECT*FROM t1 requests the retrieval of the information contained in all rows of table "t1". A subset of the information can be specified by adding a subquery to the query. For example, the subquery:

WHERE t1.c1 NOT IN (SELECT t2.c2 FROM t2)

may be added to the above-listed query to form the query

SELECT*FROM t1 WHERE t1.c1 NOT IN (SELECT t2.c2 FROM t2).

This query requests the retrieval of the information contained in all of the rows of table "t1" that have values in column "t1.c1" that do not match the values in column "t2.c2" in a table "t2". Retrieval of the same set of information can be specified by the query SELECT*FROM t1 WHERE t1.c1!=ALL (SELECT t2.c2 FROM t2).

If column "t2.c2" is not allowed to contain NULLs, then a database application can process these queries efficiently by traversing an index associated with "t2.c2". Specifically, for each row in table "t1", the database application determines whether the value in column "t1.c1" is in the index associated with "t2.c2". If it is, then the row does not satisfy the query. Otherwise, the row satisfies the query.

INEFFICIENCY CAUSED BY NULLS

If column "t2.c2" is allowed to contain NULLs, then processing the above-listed queries becomes less efficient and/or requires a more complex machinery for executing queries. For example, assume that column "t2.c2" of table "t2" is allowed to contain NULLs. Under these circumstances, a database application would not be able to determine whether a particular row satisfies the above-listed query by simply searching the index of column "t2.c2" for the value in column "t1.c1" of the row. In addition, it would have to be determined whether there exists any row in table "t2" with a NULL value in column "c2". This additional determination may not be made efficiently on all systems and could possibly prevent an index on "t2.c2" from being used. Alternatively, a system seeking to make this additional determination efficiently may require a more complex underlying machinery for executing the query.

EXISTS-EQUIVALENT SUBQUERIES

Assuming that NULLs may be present in columns "t1.c1" and "t2.c2", the queries discussed above are equivalent to the query:

SELECT*FROM t1 WHERE NOT EXISTS (SELECT 1 FROM t2 WHERE t1.c1=t2.c2 OR
t1.c1 IS NULL OR
t2.c2 IS NULL).

In this query, the "NOT IN" and "!=ALL" subqueries have been replaced by a "NOT EXISTS" subquery. Subqueries that can be replaced by "EXISTS S" or "NOT EXISTS S" subqueries, where S is a SELECT statement, are referred to herein as EXISTS-equivalent subqueries. In the SQL language, some forms of ALL, ANY, IN, NOT IN, and SOME subqueries are semantically equivalent to some form of an EXISTS type subquery, and are therefore EXISTS-equivalent subqueries.

EXISTS-equivalent subqueries that are equivalent to EXISTS subqueries in which the WHERE statement contains two or more disjunctively combined (i.e. ORed) logical expressions are inefficient to process because they may prevent efficient access methods, such as index scans, from being used to access the data in the tables specified in the subqueries.

Based on the foregoing, it is clearly desirable to provide an apparatus and method for efficiently processing EXISTS-equivalent subqueries. In particular, it is desirable to provide a method and apparatus for efficiently processing EXISTS-equivalent subqueries that are equivalent to EXISTS subqueries in which the WHERE statement contains two or more disjunctively combined logical expressions.

SUMMARY OF THE INVENTION

The present invention provides a method for transforming database queries that have EXISTS-equivalent subqueries (i.e. subqueries that are semantically equivalent to EXISTS or NOT EXISTS subqueries). The transformed queries produced by the present invention may be processed more efficiently by database applications than the original queries. Consequently, the method is preferably performed prior to performing the index and table accesses required to determine the data that satisfies the queries.

According to the method, logical expressions are removed from a WHERE CLAUSE in the original EXISTS-equivalent subquery to produce a revised subquery. For each of the logical expressions that are removed, a substitute query component is generated based on whether (1) the logical expression contains any reference to any table in a FROM-list in the EXISTS-equivalent subquery and (2) the original EXISTS-equivalent subquery is equivalent to an EXISTS or a NOT EXISTS subquery. The transformed query is created by replacing the original EXISTS-equivalent subquery with the revised subquery and the query components that were generated for each of removed logical expressions. Some of the substitute query components, including the revised subquery, may be merged based on knowledge of access paths.

These transformation techniques may be applied after converting the EXISTS-equivalent subquery to an EXISTS or NOT EXISTS subquery. Alternatively, the techniques may be applied directly to queries that contain EXISTS-equivalent subqueries without converting the EXISTS-equivalent subqueries to EXISTS or NOT EXISTS subqueries.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for efficiently evaluating EXISTS-equivalent subqueries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
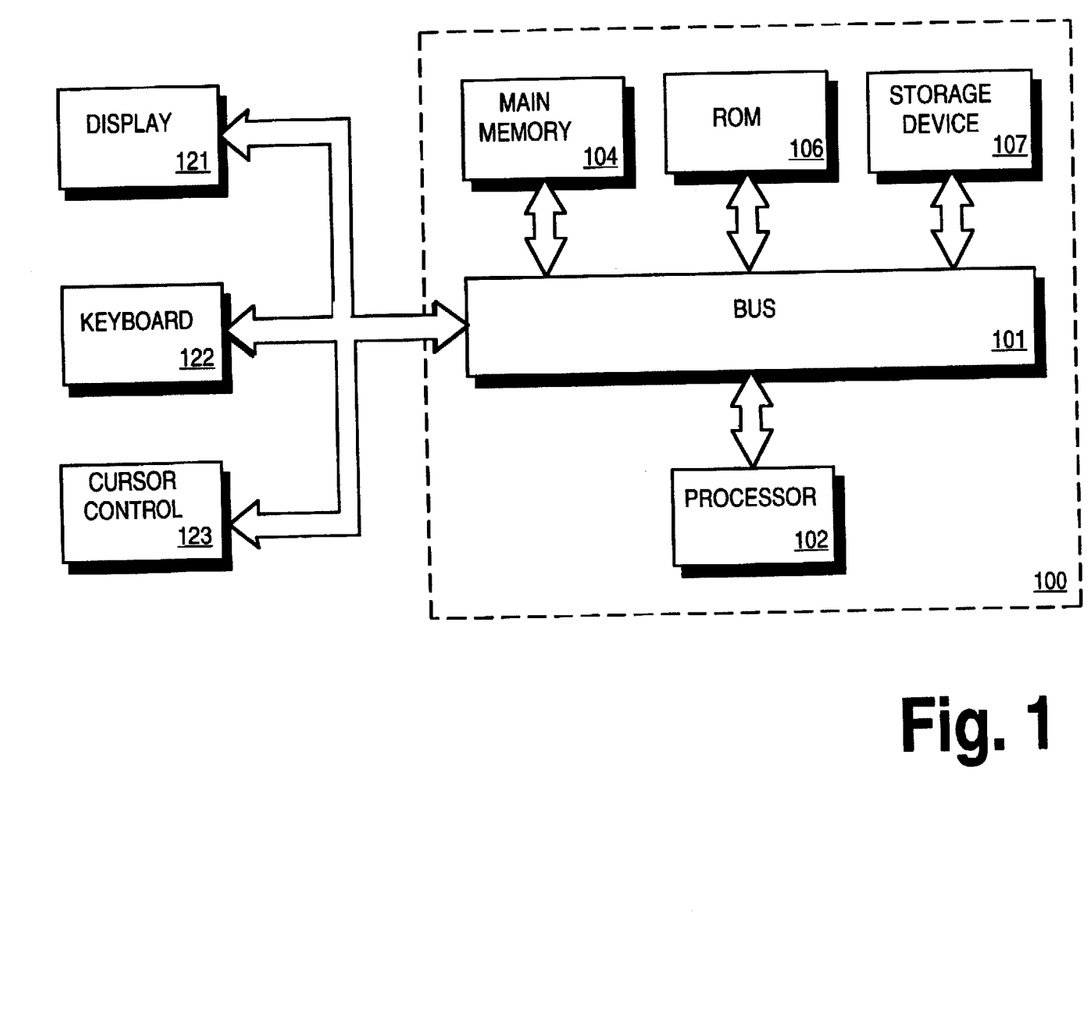
FIG. 1 is a block diagram of a system which may be programmed to implement the present invention.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information m a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g.,x) and a second axis (e.g.,y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

In the currently preferred embodiment, the present invention is related to the use of computer system 100 to implement a database application that transforms EXISTS-equivalent subqueries prior to performing the index and table scanning operations required to determine which information satisfies the EXISTS-equivalent subqueries. The transformation performed on the EXISTS-equivalent subqueries converts the EXISTS-equivalent subqueries into query components that may be evaluated using database access methods that are more efficient than those available for processing the EXISTS-equivalent subqueries prior to the transformation. The process of transforming EXISTS-equivalent subqueries shall now be described in greater detail.

OVERVIEW OF TRANSFORMATION

The transformation technique employed by the present invention shall be explained with reference to the transformation of a NOT EXISTS subquery. However, as mentioned above, SQL contains other subquery constructs that are semantically equivalent to a subquery that has the form "EXISTS S" or "NOT EXISTS S", where S is a SELECT statement that has a WHERE clause in the form "WHERE LE1 OR LE2 OR ... OR LEn", where each LEi is a logical expression. Consequently, the techniques described herein apply to all EXISTS-equivalent subqueries, whether or not such subqueries are actually in the form of an EXISTS statement. According to one embodiment, the transformation techniques are applied to EXISTS-equivalent subqueries by first transforming such subqueries to the EXISTS or NOT EXISTS subquery with which they are equivalent. According to another embodiment, the techniques are adapted to directly transform EXISTS-equivalent subqueries without first converting the subqueries to the EXISTS format.

In general, the transformation technique of the present invention transforms EXISTS subqueries by (1) removing disjuncts from the WHERE-clause of the subqueries and (2) replacing the disjuncts with new disjuncts or conjuncts in the WHERE-clause in which the subquery is located. While the form of the subquery is changed during the transformation, the new subqueries and/or predicates added to the surrounding WHERE-clause guarantee that the transformation preserves the semantics of the original query.

TERMINOLOGY

Prior to describing the transformation process, terms for the various components of queries with EXISTS-equivalent subqueries shall be established.

The exemplary query:

SELECT*FROM t1 WHERE

NOT EXISTS (SELECT 1 FROM t2 WHERE
    t1.c1 =t2.c2 OR
    t1.c1 IS NULL OR
    t2.c2 IS NULL)

which shall be used to demonstrate the various steps of the query transformation process, shall also be used to establish the terminology that shall be used hereafter.

The exemplary query includes the subquery:
NOT EXISTS (SELECT 1 FROM t2 WHERE
    t1.c1=t2.c2 OR
    t1.c1 IS NULL OR
    t2.c2 IS NULL)

which is referred to as the EXISTS-equivalent subquery (EES). In the exemplary query, the EXISTS-equivalent subquery is in the form of a NOT EXISTS statement. In general, an EXISTS-equivalent subquery is any subquery that is semantically equivalent to an EXISTS or NOT EXISTS statement.

Figure 2:
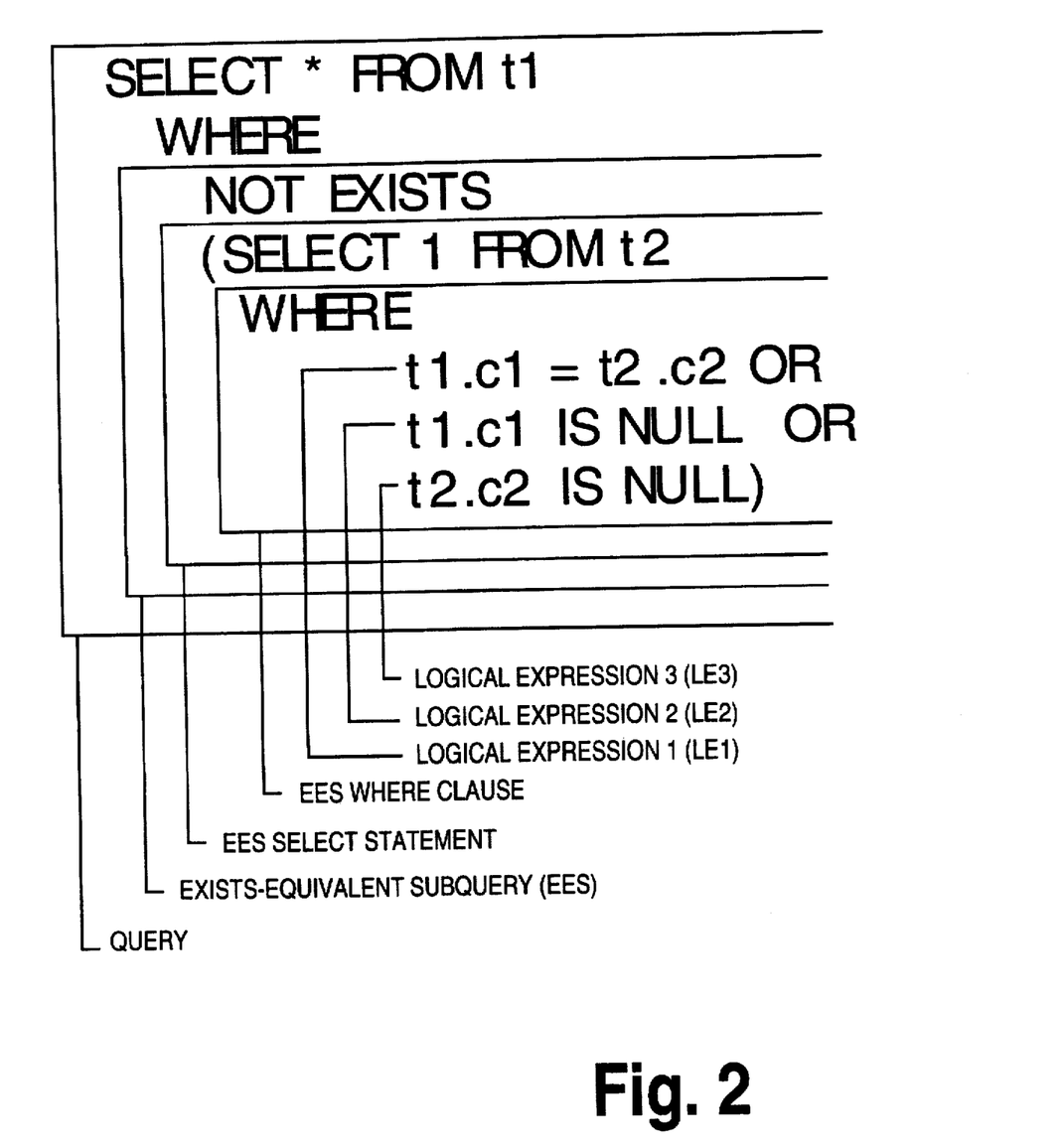
FIG. 2 illustrates the components of an exemplary EXISTS-equivalent subquery.

The EXISTS-equivalent subquery includes a SELECT statement which is referred to as the EES SELECT statement. The EES SELECT statement includes a WHERE clause which is referred to as the EES WHERE clause. The EES WHERE clause in the exemplary query is:
WHERE
    t1.c1=t2.c2 OR
    t1.c1 IS NULL OR
    t2.c2 IS NULL The EES WHERE clause includes a disjunction of logical expressions LE1 OR LE2 OR . . . OR LEn. In the exemplary query, the logical expressions in the EES WHERE clause include "t1.c1=t2.c2", "t1.c1 IS NULL", and "t2.c2 IS NULL". In FIG. 2 the various components of the exemplary query are identified.

QUERY TRANSFORMATION

Figure 3:
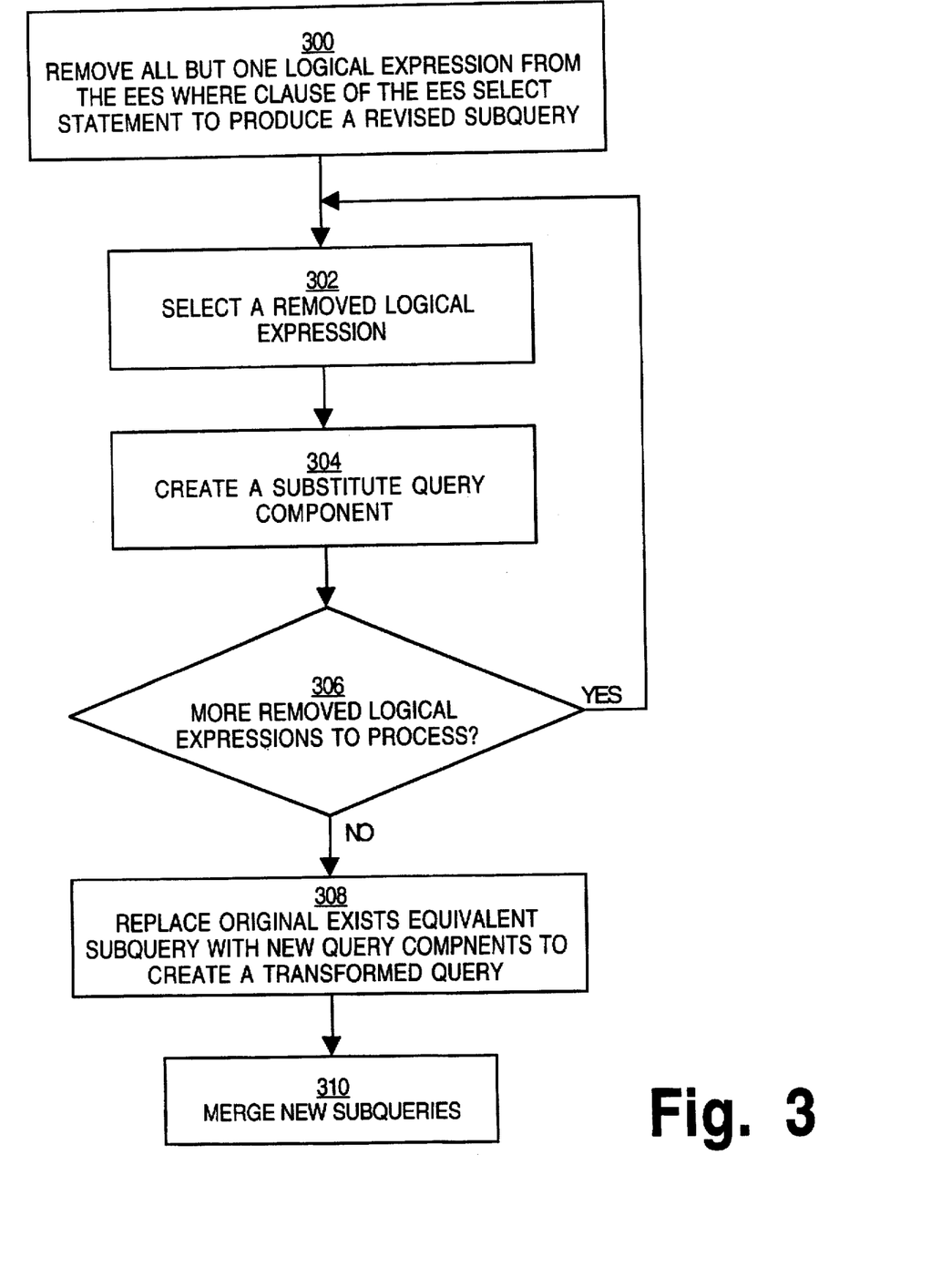
FIG. 3 is a flow chart illustrating steps for transforming an EXISTS-equivalent subquery.

An embodiment of the EXISTS-equivalent subquery transformation process shall now be described with reference to the exemplary query and to FIGS. 3–4. Referring to FIG. 3, the first step of the transformation is performed by removing all but one of the logical expressions from the EES WHERE clause (step 300). For the purpose of explanation, it shall be assumed that LE1 is the logical expression that is not removed from the EES WHERE clause. Removing all but one of the logical expressions from the EES WHERE clause produces a revised subquery (EES') with an EES SELECT statement S' that has an EES WHERE clause of the form "WHERE LE1".

In the exemplary query, this step is performed by removing the second and third disjunct ("t1.c1 IS NULL" and "t2.c2 IS NULL") from the EES WHERE clause. After these disjuncts are removed, the exemplary query becomes:

SELECT*FROM t1 WHERE

NOT EXISTS (SELECT 1 FROM t2 WHERE t1.c1=t2.c2)

The revised EXISTS-equivalent subquery (EES') created by this step is "NOT EXISTS (SELECT 1 FROM t2 WHERE t1.c1=t2.c2)". This revised EXISTS-equivalent subquery (EES') is one of many query components that will be used to replace the original EXISTS-equivalent subquery, as shall be described in greater detail hereafter.

Once the revised EXISTS-equivalent subquery has been created as described above, a substitute query component is created for each of the logical expressions that were removed from the original EES WHERE clause. Specifically, steps 302, 304 and 306 define a loop in which a series of query components (LE2', . . . ,LEn') are generated from the removed logical expressions (LE2, . . . , LEn). For each logical expression LEi, 2<=i<=n, a substitute query component LEi' is generated at step 304. In the exemplary query, the logical expressions "t1.c1 IS NULL" and "t2.c2 IS NULL" were removed from the EES WHERE clause. Thus, step 304 will be performed for each of the logical expressions "t1.c1 IS NULL" and "t2.c2 IS NULL".

The substitute query component LEi' is generated for an expression LEi based on (1) whether the original logical expression LEi contains any references to any table in the FROM-list of the EES SELECT statement, and (2) whether the original EXISTS-equivalent subquery was equivalent to an EXISTS S subquery or to a NOT EXISTS S subquery. The steps involved in generating a substitute query component LEi' for an expression LEi are illustrated in FIG. 4.

Figure 4:
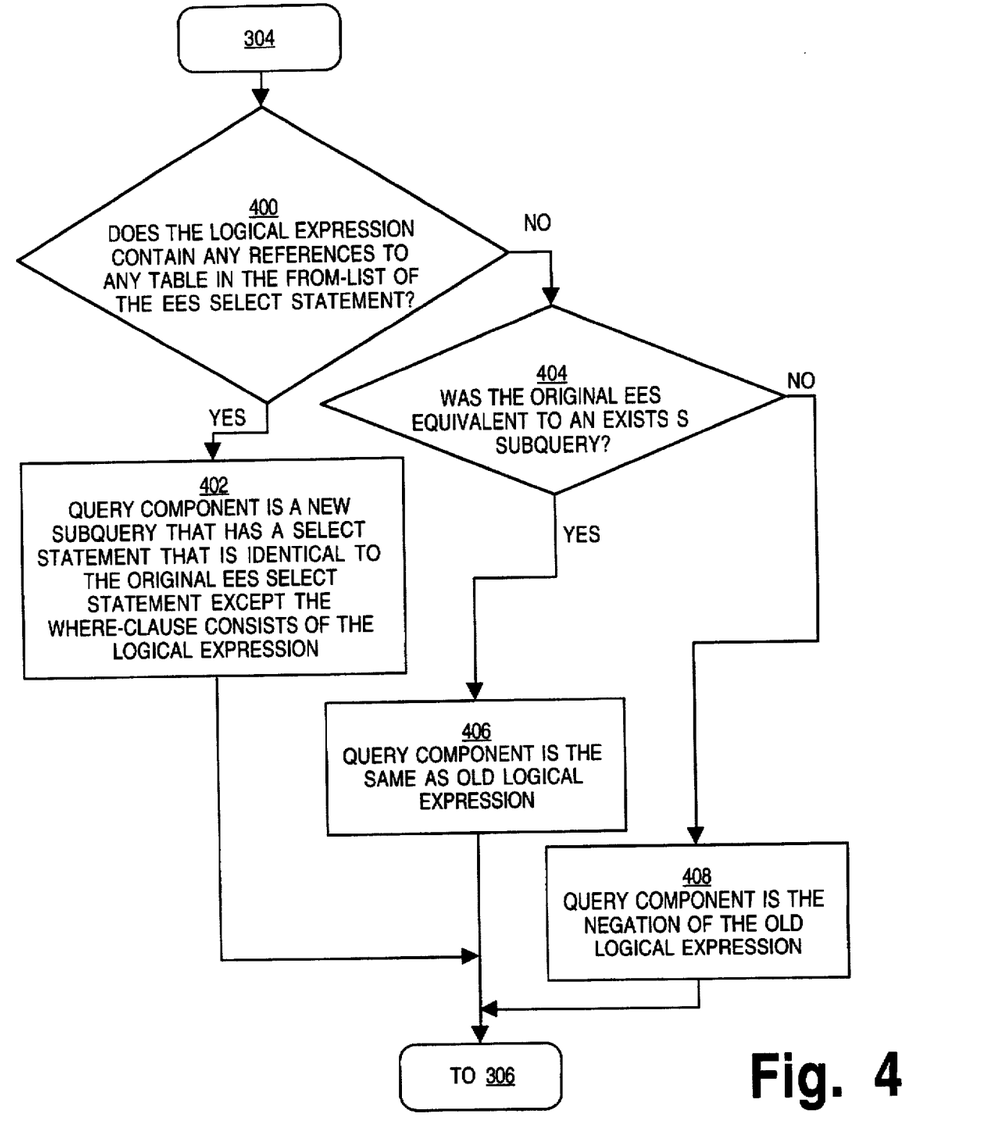
FIG. 4 is a flow chart showing step 304 of FIG. 3 in greater detail.

Referring to FIG. 4, at step 400 it is determined whether the logical expression at issue contains any references to any table in the FROM list of the EES SELECT statement. If the logical expression at issue contains any references to any table in the FROM list of the EES SELECT statement, then control passes to step 402. If the logical expression at issue does not contain any references to any table in the FROM list of the EES SELECT statement, then control passes to step 404. In the exemplary query, the FROM list of the EES SELECT statement refers only to table t2. The logical expression "t1.c1 IS NULL" does not contain any reference to table t2. Therefore, in the first iteration of step 304 control will pass from step 400 to step 404.

At step 404, it is determined whether the original EXISTS-equivalent subquery was equivalent to an EXISTS subquery. If the original EXISTS-equivalent subquery was equivalent to an EXISTS subquery, then control passes to step 406. If the original EXISTS-equivalent subquery was equivalent to a NOT EXISTS subquery, then control passes to step 408. In the exemplary query, the original EXISTS-equivalent subquery is a NOT EXISTS subquery, so control passes to step 408.

At step 408, the negation of the old logical expression is generated as the substitute query component for the old logical expression. In the present example, the old logical expression is "t1.c1 IS NULL". Therefore, at step 408 the substitute query component "t1.c1 IS NOT NULL" is generated. Thus, for the exemplary query, LE2' is "t1.c1 IS NOT NULL".

As mentioned above, control passes to step 406 when (1) the logical expression does not contain any references to any table in the FROM list of the EES SELECT statement and (2) the original EXISTS-equivalent subquery is equivalent to an EXISTS subquery. Under these conditions, the logical expression at issue is used as the substitute query component (i.e. LEi'=LEi).

Once the substitute logical expression has been determined for the logical expression "t1.c1 IS NULL", control will loop back from step 306 to step 302. During the second iteration, the logical expression "t2.c2 IS NULL" is selected and processed. At step 400 it is determined whether the logical expression at issue contains any references to any table in the FROM list of the EES SELECT statement. If the logical expression at issue contains any references to any table in the FROM list of the EES SELECT statement, then control passes to step 402. If the logical expression at issue does not contain any references to any table in the FROM list of the EES SELECT statement, then control passes to step 404. Logical expression "t2.c2 IS NULL" contains a reference to table t2. Therefore, control will pass from step 400 to step 402.

At step 402 a new subquery is generated as the substitute query component. The new subquery is of the same type, with respect to EXISTS/NOT EXISTS, as the original EXISTS-equivalent subquery. That is, if the original EXISTS-equivalent subquery was equivalent to an EXISTS subquery, then the new subquery is also equivalent to an EXISTS subquery. On the other hand, if the original EXISTS-equivalent subquery was equivalent to a NOT EXISTS subquery, then the new subquery is equivalent to a NOT EXISTS subquery. The SELECT-statement of the new subquery is identical to the original EES SELECT statement except for the WHERE-clause, which only consists of LEi, the logical expression at issue.

In the exemplary query, the original subquery was a NOT EXISTS subquery. Consequently, the substitute query component for "t2.c2 IS NULL" is a NOT EXISTS subquery. The SELECT-statement of the new subquery is identical to the SELECT statement S of the original EXISTS-equivalent subquery, except the WHERE-clause exclusively consists of "t2.c2 IS NULL". Thus, LE3', the substitute query component for "t2.c2 IS NULL", is "SELECT 1 FROM t2 WHERE t2.c2 IS NULL".

Referring again to FIG. 3, once substitute query components have been determined for all of the logical expressions that where removed from the original EES WHERE clause, control passes to step 308. At step 308, the original EXISTS-equivalent subquery is replaced with the query components created at steps 300 and 304. How the original EXISTS-equivalent subquery is replaced depends on whether the original subquery was equivalent to an "EXISTS S" or to a "NOT EXISTS S" subquery. Step 308 is shown in greater detail in FIG. 5.

Figure 5:
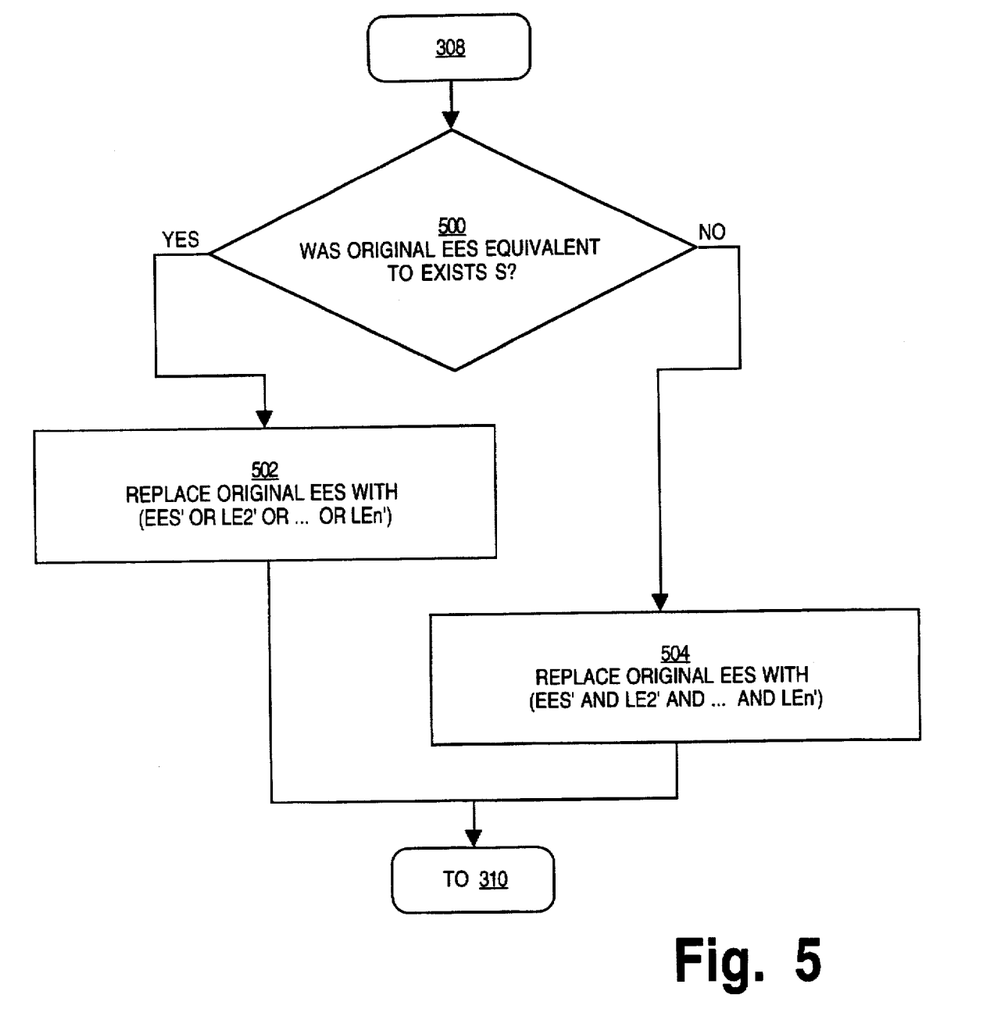
FIG. 5 is a flow chart showing the step 308 of FIG. 3 in greater detail.

Referring to FIG. 5, it is determined whether the original EXISTS-equivalent subquery was equivalent to an EXISTS subquery. If the original EXISTS-equivalent subquery was equivalent to an EXISTS subquery, then control passes to step 502. If the original EXISTS-equivalent subquery was equivalent to a NOT EXISTS subquery, then control passes to step 504. At step 502, the original EXISTS-equivalent subquery is replaced by (EES' OR LE2' OR ... OR LEn') where LE2', ..., LEn' are the substitute query components generated from LE2, ..., LEn as described above. At step 504, the original EXISTS-equivalent subquery is replaced by (EES' AND LE2' AND ... AND LEn') where LE2', ..., LEn' are the substitute query components generated from LE2, ..., LEn as described above.

In the exemplary query, the original subquery was a NOT EXISTS subquery. Consequently, the second and third disjuncts are replaced by two additional conjuncts in the surrounding WHERE-clause. After performing this step, the query has been transformed to:

SELECT*FROM t1 WHERE

NOT EXISTS (SELECT 1 FROM t2 WHERE t1.c1= t2.c2) AND
t1.c1 IS NOT NULL AND
NOT EXISTS (SELECT 1 FROM t2 WHERE t2.c2 IS NULL)

Referring again to FIG. 3, the subqueries in the transformed query are merged based on knowledge of access paths at step 310. The determinations performed at this step will vary from implementation to implementation depending on the access methods used by a particular database application and the correlation between those access methods and the types of subqueries for which they are used. For example, assume that it is known that some of the newly created subqueries, resulting from logical expressions LEk1, ..., LEkm, would use an access method that can be used when the EES WHERE clause contains a disjunction. If it is more costly to evaluate the individual subqueries based on this access method than to evaluate a single subquery with a WHERE-clause of the form WHERE LEk1 OR LEk2 OR ... OR LEkm, these individual subqueries can be replaced by a single subquery with a WHERE-clause of this form. This situation may occur, for example, if several subqueries would result in a full scan of the table in the subquery. Specifically, it could be more expensive to carry out such a scan once for each subquery than to carry it out only once and evaluate a disjunction of logical expressions for each row that is retrieved.

Generally, it is much more efficient to process transformed queries produced by the transformation techniques described herein than to process the original queries. For example, the original exemplary query would typically result in a full table scan of table t2 for every row in table t1. In the exemplary transformed query, the first subquery no longer contains any ORs, which may open up new access paths to table t2. Instead, there are two new conjuncts in the surrounding WHERE-clause, the first of which ("t1.c1 IS NOT NULL") is merely a simple predicate on table t1 in the outer query block. The second new conjunct ("NOT EXISTS (SELECT 1 FROM t2 WHERE t2.c2 IS NULL)") is a subquery that lacks correlation predicate. The result of this subquery is therefore constant for every row in table t1, so it is sufficient to evaluate the subquery once and store the result.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of transforming an EXISTS-equivalent subquery to query components that may be processed more efficiently than the EXISTS-equivalent subquery, the method comprising the steps of:

A) removing at least one logical expression from a WHERE clause in said EXISTS-equivalent subquery to produce a revised EXISTS-equivalent subquery;

B) generating one or more substitute query components by performing the following steps for each of said at least one logical expression removed from said WHERE clause:

B1) determining whether said logical expression contains a reference to a table in a FROM list of a SELECT statement in said EXISTS-equivalent subquery, B2) determining a substitute query component for said logical expression based on
  a) whether said logical expression contains a reference to a table in said FROM list of said SELECT statement in said EXISTS-equivalent subquery, and
  b) whether said EXISTS-equivalent subquery is equivalent to an EXISTS subquery or to a NOT EXISTS subquery; and C) replacing the EXISTS-equivalent subquery with said revised EXISTS-equivalent subquery and said one or more substitute query components.

2. The method of claim 1 further comprising the steps of:
determining whether said EXISTS-equivalent subquery is equivalent to an EXISTS subquery or to a NOT EXISTS subquery;
if said EXISTS-equivalent query is equivalent to an EXISTS subquery, then combining said revised EXISTS-equivalent query and said one or more substitute queries with a disjunctive operator to create an expression semantically equivalent to said EXISTS-equivalent subquery; and
if said EXISTS-equivalent query is equivalent to a NOT EXISTS subquery, then combining said revised EXISTS-equivalent query and said one or more substitute queries with a conjunctive operator to create an expression semantically equivalent to said EXISTS-equivalent subquery.

3. The method of claim 1 further comprising the step of merging said revised EXISTS-equivalent query and said one or more substitute query components based upon access paths used by a database application to identify data satisfied by said revised EXISTS-equivalent query and said one or more substitute query components.

4. The method of claim 1 wherein said step of determining a substitute query component for said logical expression comprises:
if said logical expression contains a reference to a table in said FROM list of said SELECT statement in said EXISTS-equivalent subquery, then establishing as said substitute query component a new subquery that has a SELECT statement identical to said SELECT statement in said EXISTS-equivalent subquery, and which has a WHERE clause that consists of said logical expression;
if said logical expression does not contain a reference to a table in said FROM list of said SELECT statement in said EXISTS-equivalent subquery and said EXISTS-equivalent subquery is equivalent to an EXISTS subquery, then establishing as said substitute query component said logical expression; and
if said logical expression does not contain a reference to a table in said FROM list of said SELECT statement in said EXISTS-equivalent subquery and said EXISTS-equivalent subquery is equivalent to a NOT EXISTS subquery, then establishing as said substitute query component a negative of said logical expression.

5. The method of claim 1 wherein said EXISTS-equivalent subquery is not an EXISTS subquery nor a NOT EXISTS subquery, the method further comprising the steps of:
if said EXISTS-equivalent subquery is semantically equivalent to an EXISTS subquery, then transforming said EXISTS-equivalent subquery into an EXISTS subquery prior to performing the step of removing at least one logical expression; and
if said EXISTS-equivalent subquery is semantically equivalent to a NOT EXISTS subquery, then transforming said EXISTS-equivalent subquery into a NOT EXISTS subquery prior to performing the step of removing at least one logical expression.

6. The method of claim 1 wherein said EXISTS-equivalent subquery is a NOT IN subquery.

7. A computer-readable medium having stored thereon sequences of instructions, said sequences of instructions including instructions which, when executed by a processor, cause said processor to perform the steps of:

A) removing at least one logical expression from a WHERE clause in an EXISTS-equivalent subquery to produce a revised EXISTS-equivalent subquery;
B) generating one or more substitute query components by performing the following steps for each of said at least one logical expression removed from said WHERE clause:
B1) determining whether said logical expression contains a reference to a table in a FROM list of a SELECT statement in said EXISTS-equivalent subquery,
B2) determining a substitute query component for said logical expression based on
a) whether said logical expression contains a reference to a table in said FROM list of said SELECT statement in said EXISTS-equivalent subquery, and
b) whether said EXISTS-equivalent subquery is equivalent to an EXISTS subquery or to a NOT EXISTS subquery; and
C) replacing the EXISTS-equivalent subquery with said revised EXISTS-equivalent subquery and said one or more substitute query components.

8. The computer-readable medium of claim 7 further containing instructions which, when executed by said processor, would cause said processor to perform the steps of:
determining whether said EXISTS-equivalent subquery is equivalent to an EXISTS subquery or to a NOT EXISTS subquery;
if said EXISTS-equivalent query is equivalent to an EXISTS subquery, then combining said revised EXISTS-equivalent query and said one or more substitute queries with a disjunctive operator to create an expression semantically equivalent to said EXISTS-equivalent subquery; and
if said EXISTS-equivalent query is equivalent to a NOT EXISTS subquery, then combining said revised EXISTS-equivalent query and said one or more substitute queries with a conjunctive operator to create an expression semantically equivalent to said EXISTS-equivalent subquery.

9. The computer-readable medium of claim 7 further containing instructions which, when executed by said processor, would cause said processor to perform the steps of:
merging said revised EXISTS-equivalent query and said one or more substitute query components based upon access paths used by a database application to identify data satisfied by said revised EXISTS-equivalent query and said one or more substitute query components.

10. The computer-readable medium of claim 7 wherein said step of determining a substitute query component for said logical expression comprises:
if said logical expression contains a reference to a table in said FROM list of said SELECT statement in said EXISTS-equivalent subquery, then establishing as said substitute query component a new subquery that has a SELECT statement identical to said SELECT statement in said EXISTS-equivalent subquery, and which has a WHERE clause that consists of said logical expression;
if said logical expression does not contain a reference to a table in said FROM list of said SELECT statement in said EXISTS-equivalent subquery and said EXISTS-equivalent subquery is equivalent to an EXISTS subquery, then establishing as said substitute query component said logical expression; and if said logical expression does not contain a reference to a table in said FROM list of said SELECT statement in said EXISTS-equivalent subquery and said EXISTS-equivalent subquery is equivalent to a NOT EXISTS subquery, then establishing as said substitute query component a negative of said logical expression.

11. The computer-readable medium of claim 7 wherein said EXISTS-equivalent subquery is not an EXISTS subquery nor a NOT EXISTS subquery, the computer-readable medium further containing instructions which, when executed by said processor, would cause said processor to perform the steps of:

if said EXISTS-equivalent subquery is semantically equivalent to an EXISTS subquery, then transforming said EXISTS-equivalent subquery into an EXISTS subquery prior to performing the step of removing at least one logical expression; and if said EXISTS-equivalent subquery is semantically equivalent to a NOT EXISTS subquery, then transforming said EXISTS-equivalent subquery into a NOT EXISTS subquery prior to performing the step of removing at least one logical expression.

12. A computer-implemented method of transforming an EXISTS-equivalent subquery to query components that may be processed more efficiently than the EXISTS-equivalent subquery, the method comprising the steps of:

A) removing at least one logical expression from a clause in said EXISTS-equivalent subquery to produce a revised EXISTS-equivalent subquery;

B) determining one or more substitute query components for said at least one logical expression; and C) replacing the EXISTS-equivalent subquery with said revised EXISTS-equivalent subquery and said one or more substitute query components.

13. The method of claim 12 wherein said step of removing at least one logical expression from a clause includes removing at least one logical expression from a WHERE clause.

14. The method of claim 12 wherein the one or more substitute query components are determined based on whether said at least one logical expression contains a particular type of reference.

15. The method of claim 14 wherein:

the method further comprises the step of determining whether said logical expression contains a reference to a table in a FROM list of a SELECT statement in said EXISTS-equivalent subquery; and the one or more substitute query components are determined based on whether said logical expression contains a reference to a table in a FROM list of a SELECT statement in said EXISTS-equivalent subquery.

16. The method of claim 12 wherein the one or more substitute query components are determined based on whether said EXISTS-equivalent subquery is equivalent to an EXISTS subquery or to a NOT EXISTS subquery.

17. The method of claim 16 wherein the one or more substitute query components are also determined based on whether said at least one logical expression contains a particular type of reference.

18. The method of claim 17 wherein:

the method further comprises the step of determining whether said logical expression contains a reference to a table in a FROM list of a SELECT statement in said EXISTS-equivalent subquery; and the one or more substitute query components are determined based on whether said logical expression contains a reference to a table in a FROM list of a SELECT statement in said EXISTS-equivalent subquery.

\* \* \* \* \*